United States Patent [19]

McCauley

[11] Patent Number: 4,948,041
[45] Date of Patent: Aug. 14, 1990

[54] THERMOSTATIC GARDEN HOSE PROTECTION DEVICE

[76] Inventor: John P. McCauley, 3040 Aloma Avenue, Apartment B-8, Winter Park, Fla. 32792

[21] Appl. No.: 319,829

[22] Filed: Mar. 3, 1989

Related U.S. Application Data

[63] Continuation of Ser. No. 145,966, Jan. 20, 1988, abandoned.

[51] Int. Cl.$^5$ ............................................. G05D 23/12
[52] U.S. Cl. .................................. 236/93 A; 236/99 T
[58] Field of Search .................... 236/93 A, 93 B, 99 J

[56] References Cited

U.S. PATENT DOCUMENTS

| | | | |
|---|---|---|---|
| 2,630,973 | 3/1953 | Kloth | 236/93 A X |
| 2,642,229 | 6/1953 | Mueller et al. | 236/93 A |
| 3,263,926 | 8/1966 | Couffer et al. | 236/93 B |
| 3,368,758 | 2/1968 | Fraser | 236/93 B |
| 4,180,208 | 12/1979 | Obermaier | 236/93 B |
| 4,190,198 | 2/1980 | Casuga et al. | 236/93 A X |
| 4,262,844 | 4/1981 | Sekuja | 236/93 B X |
| 4,281,790 | 8/1981 | McGinnis | 236/93 B |

Primary Examiner—William E. Tapolcai
Attorney, Agent, or Firm—Livingston, Edward M.

[57] ABSTRACT

A device to protect garden hoses and other fluid conduits from wear and bursting caused by pressure build-up due to heat generation particularly from the sun's rays. The device can be attached between the house spigot and hose or at the end of a hose between the hose and spray attachment. The device comprises a housing with a threaded inlet end for attachment to a hose or spigot, a central chamber containing a thermostat in a valve moveably mounted on a spring, which together are adapted to open water release holes at the outlet port end when water temperatures reach a predetermined level and close when the water temperature decreases to a second predetermined level. Sufficient openings in the device, allow full flow of fluid through the inlet port, the chamber and the outlet port and attachment, but still provides protection against pressure build-up when the hose is not in use.

4 Claims, 2 Drawing Sheets

THERMOSTATIC GARDEN HOSE PROTECTION DEVICE

This application is a continuation of application Ser. No. 145,966, filed Jan. 20, 1988, now abandoned.

BACKGROUND OF THE INVENTION

This invention relates to fluid control valves and more particularly to a thermostatic relief valve for garden hoses. It is common for garden and lawn hoses to rupture or burst due to the sun's rays heating the water in the hose, thereby causing expansion and pressure build-up between the house spigot and the spray nozzle on the end of the hose. Even the strongest reinforced hoses will, over a period of time, weaken, become deformed or even burst due to pressure build-up within. Thus, there is a need for a device which relieves such pressure buildup within garden hoses.

The prior art contains thermostatic relief valves for automobiles and shower heads, but none for use on garden or lawn hoses. For instance, U.S. Pat. No. 4,295,602 by Priesmeyer and U.S. Pat. No. 4,262,844 by Sekiya disclose temperature responsive control valves for use on shower heads which restricts the water flow at certain temperatures. U.S. Pat. No. 4,344,564 by Magnuson discloses a T-shaped temperature-sensitive valve which allows fluid to bypass when the fluid temperature attains certains levels or pressure exceeds certain limits. Also, U.S. Pat. No. Re. 29,155 by Mears, et al., shows a fire protection sprinkler with a water bypass.

Contrary to the above-mentioned devices, the instant device can be attached to a lawn or garden hose and still allow full flow through the hose when in use while protecting it from pressure bursting when not in use. The device accomplishes the latter by allowing a sufficient amount of water to be released through ports until the temperature of the fluid is reduced to an acceptable level. In this manner, damage to the hose caused by pressure build-up is eliminated.

SUMMARY OF THE INVENTION

The primary object of the invention is to provide a means for protecting garden hoses and other fluid conduits from damage caused by heat and pressure build-up therein.

A corollary object of the invention is to provide such a device which can be permanently attached to a hose for use at all times which does not interfere with or interrupt the flow of water through the hose during use.

A further object of the invention is to provide such a device which is simple to use and inexpensive.

The instant device accomplishes the above and other objects by providing a protective device which attaches to a lawn or garden hose by means of threaded ends and which has a housing between its inlet and outlet ends containing a chamber with a temperature-sensitive release mechanism therein. This temperature-sensitive release mechanism consists of a springmounted valve which holds a temperature-sensitive element, such as a thermostat. The thermostat has a piston which extends outward against a washer-type stopper at the outlet end of the chamber when the fluid temperature increases. At a predetermined temperature level the backwards pressure exerted on the spring by the force of the piston against the stopper exceeds the spring tension which moves a ring like gasket on the top of the valve away from small relief ports around the outlet end of the chamber to allow hot water to be released. Once the water temperature decreases to an acceptable predetermined temperature by release of sufficient hot water to be released, the tension of the spring exceeds the backward pressure of the piston causing the piston to retract allowing the spring to push the gasket against the relief ports to seal them once again. Since the device has wide apertures throughout the housing, no interruption of flow results and full flow of fluid through the hose is still possible when the hose is in use.

Other objects, advantages and features of this invention will become more readily apparent from the following detailed description of the specific embodiments thereof when read in conjunction with the accompanying drawings.

BRIEF DESCRIPTION OF THE DRAWINGS

The drawings appended hereto are as follows.

DESCRIPTION OF THE PREFERRED EMBODIMENT

Figure 1:
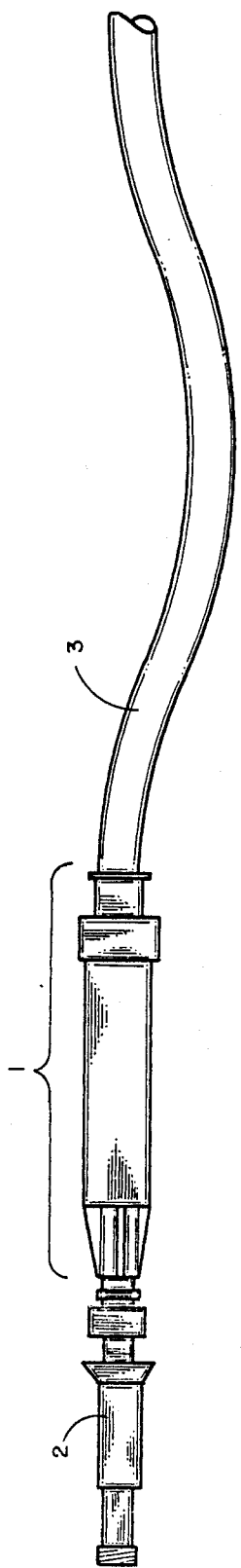
FIG. 1 is a perspective view of the device showing it attached to the end of a hose and a spray attachment.
Figure 2:
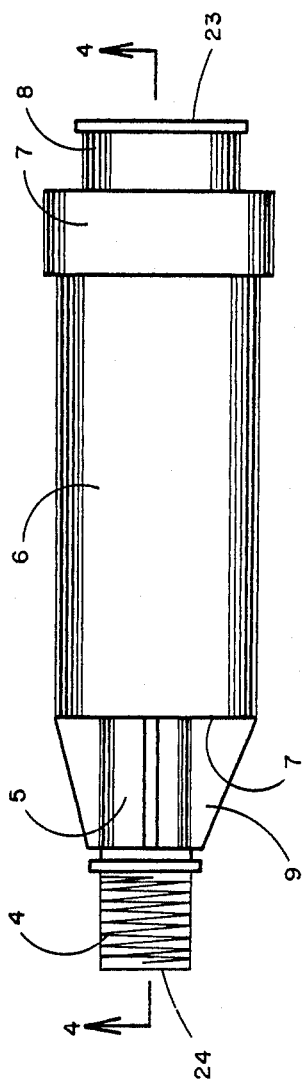
FIG. 2 is a side view of the device itself.

Referring in detail to the drawings, FIG. 1 shows the garden hose protection device generally as 1 attached to the end of a hose 3 and spray attachment 2. The exterior components of the device itself are shown in FIG. 2. On the inlet end of the device which attaches to the hose 3 or alternatively to a house spigot is an inlet port 23 which has a threaded female hose attachment 8. A transition piece 7 couples the hose attachment 8 to a cylindrical housing 6 which contains the operational elements therein as described in more detail hereinafter. On the outlet end of the device is a transition piece 5 with supporting struts 9 attached to the threaded male outlet nozzle 4 with outlet port 24 so that a spray attachment 2 can be connected thereto.

Figure 3:
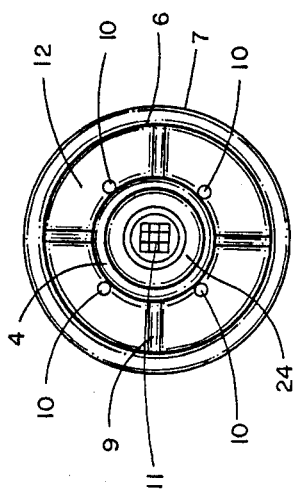
FIG. 3 is an outlet port end view of the device.

In FIG. 3 an end view of the outlet portion of the device shows the outlet port 24 with standard water filter 11 mounted therein. The fluid release ports 10 are shown in the outlet end of the cylinder 6. These fluid release ports 10 allow water to escape when the water temperature reaches a predetermined level as described in more detail hereinafter. At any time when the nozzle 2 is opened water will flow from the hose 3 and through the device 1 via the screened water filter 11.

Figure 4:
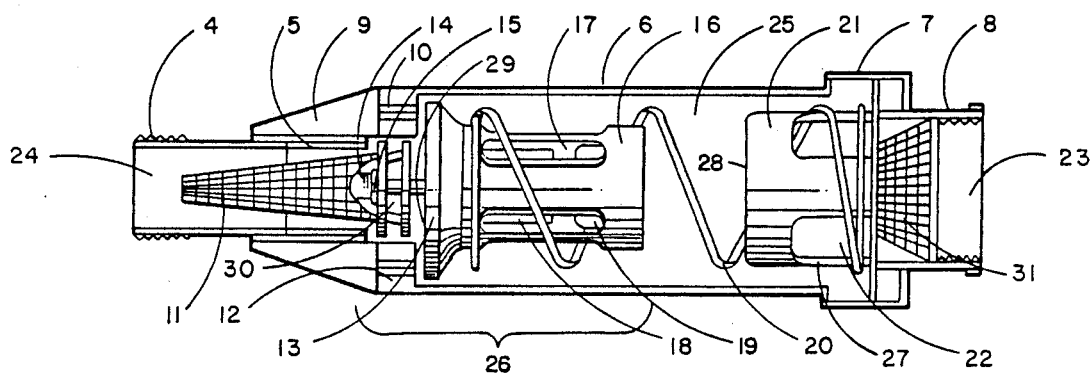
FIG. 4 is a cut-away view along lines 4—4 of FIG. 2 showing the valve in the closed position.

The cross-sectional view of FIG. 4, taken along the lines 4—4 of FIG. 2, shows the interior operational components of the device. Starting with the inlet port end, the housing 6 contains a holder 21 which is affixed to the inside of the transition piece 7. This holder 21 has several lengthwise apertures 22 between its legs 27 which enable the water to flow through and around its top 28 without interruption. A spring 20 wraps around the holder 21. In the opposite end of the spring 20 is freely mounted a valve 16. This freely mounted valve contains apertures 17 which run lengthwise to allow water to flow freely through the device. A round rubber ring like gasket 13 is fitted over the end of the valve 16. This gasket 13 fits snugly against the top 12 of the housing 6 so as to seal the fluid release ports 10 when the water temperature is below the predetermined temperature, i.e., in the closed position. This valve 16 contains a temperature-sensitive element 26 mountable inside thereof consisting of a base 19, stem 18 and a piston 15. The piston rests against a washer-like stopper 14 mounted in the top of the cylinder 12. Like a washer, the stopper 14 has a hole 30 to allow water or other fluid to flow through it.

It should be noted that FIG. 4 shows the device in the closed position, i.e., the gasket 13 is pressed against the cylinder top 12 thereby sealing the fluid release ports 10. This closed position is the normal condition for the device when the temperature of the water is below a predetermined level.

Figure 6:
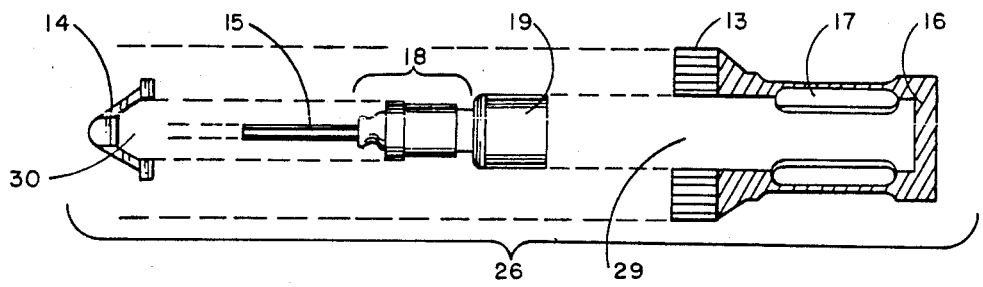
FIG. 6 is a cross-sectional view of the valve with an exploded side view of the temperature-sensitive portion of the device.

The gasket end of the valve 16 has an opening 29 in it, as better shown in FIG. 6 of the drawings, to allow water to flow through the valve apertures 17, around the base of the temperature-sensitive device 19 and through said opening 29 when the nozzle 2 is open during normal water flow.

Figure 5:
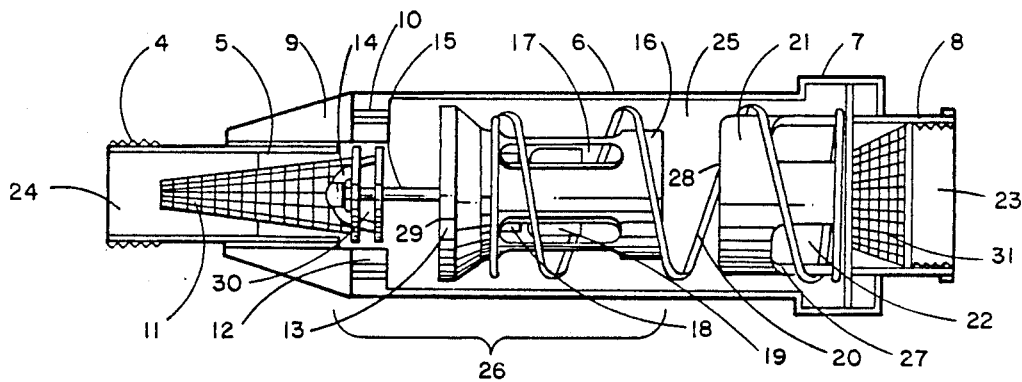
FIG. 5 is a cut-away view along lines 4—4 of FIG. 2 showing the valve in the open position.

On the other hand, FIG. 5 shows the device in the open position. The only difference from FIG. 4 is the gasket 13 is moved away from the top 12 to allow water to flow through the hole 29 in the gasket 13 to be released out the relief ports 10 in the top 12 of the housing 16. The reason for the gasket 13 being spaced away at the top 12 of the housing 6 is best described by examining the temperature-sensitive element 26 shown in the exploded view of FIG. 6. The temperature-sensitive element 26 consists of a base 19, stem 18 and piston 15. Since this element 26 is the same as commercially available thermostats, it is not necessary to describe same in detail. Suffice it to say, however, that the base 19 contains a temperature-sensitive material, such as wax, which expands and contracts with changes in temperature. When the temperature of the fluid in the chamber 25 increases, the material expands and pushes against a flexible bladder which, in turn, pushes the piston 15 from the stem 18 and against the washer-like stopper 14. The pushing of the piston 15 against the washer-like stopper 14 exerts a backward pressure on the base 19 which is transmitted to the spring 20. Once the water temperature reaches a predetermined level at which the pressure therein could damage the hose 3, the backward pressure exceeds the tension of the spring 20, thereby depressing it and moving the gasket 13 away from the top 12 of the housing 6, thus allowing the water to escape out the fluid release ports 10. Sufficient water is then released until the water temperature decreases to a second predetermined level, upon which the tension of the spring 20 overcomes the backward pressure of the piston 15, which has since decreased due to the material in the thermostat base 19 decreasing, thereby causing the gasket 13 to seal off the fluid release ports 10 once again.

Although the instant device could be made of almost any material, it would preferrably be made of plastic except for the gaskets which would be made of rubber and the thermostat, normally made of metal alloys.

As described in detail above, it should be apparent that there has been provided a new thermostatic device to be attached to garden, lawn hoses, pipes and other fluid conduits which can prevent bursting or rupturing caused by water pressure build-up resulting from heat generation often caused by the sun's rays, particularly in hot climates. This device is simple to use because it can be attached permanently to a lawn hose for use at all times and does not have to be removed when using the hose since it does not interfere with fluid flow. This device will save considerable money for consumers in that its use would allow the consumer to buy less expensive hoses which are not reinforced since using the device would save such hoses from rupture.

While one specific embodiment of the invention has been described in detail hereinabove, it should be understood that various modifications may be made from the specific details described hereinabove without departing from the spirit and scope of the invention as set forth in the appended claims.

Having thus described my invention, I claim the following:

1. A thermostatic device for protecting lawn and garden hoses and other fluid conduits from rupturing due to pressure build-up caused by temperature increase comprised of:
   an inlet port attachable to a hose, exterior house spigot or other attachments;
   a housing attached to said inlet port, said housing having a chamber containing a temperature-sensitive mechanism;
   an outlet port attachable to a hose, spray nozzle or other attachments;
   means for opening and closing the outlet port
   said temperature-sensitive mechanism having apertures in the sides and exit end to allow unimpeded flow of fluid through the outlet port when the outlet port is open, said temperature-sensitive mechanism having fluid release ports bypassing the outlet port when the outlet port is closed and temperature responsive means of opening and closing said fluid release ports communicating with said chamber; and
   whereby when the outlet port is closed so that no fluid is flowing through the device, once the fluid stagnant in the device reaches a predetermined level, said temperature-sensitive mechanism will cause the fluid release ports to open and allow said fluid to flow out of the release ports until the temperature of the fluid is below a predetermined temperature at which time the release ports are closed.

2. The device of claim 1 wherein the inlet port has a female extension with threads on the inside to couple with a threaded male extension of a house spigot or hose.

3. The device of claim 1 wherein the outlet port is a male extension threaded on the exterior to couple with a threaded female extension on a hose or spray nozzle.

4. The device of claims 1, 2 or 3 wherein the temperature-sensitive mechanism consists of a spring with one end attached to the inlet port and the other end having a valve moveably mounted therein, said valve having apertures in its sides and an opening in its outlet end to allow fluid flow therethrough and a gasket on top communicating with the fluid release ports in the outlet end of the chamber, and a thermostat mounted in the valve, said thermostat having a piston which communicates with a washer-like stopper at the outlet end of the chamber in a matter such that when an increase in fluid temperature reaches a predetermined level, the pushing of the piston against the stopper exerts a backward force exceeding the tensile force of the spring which depresses the spring, thereby moving the gasket away from the release ports until the fluid temperature decreases to a second predetermined level, at which temperature the pressure of the piston reduces and the spring pushes the valve and the gasket against the fluid release ports to seal same.

* * * * *